Oct. 13, 1942.                A. BRÜGGER                 2,298,819
        AUTOMATIC FEED DEVICE FOR THE THREAD GUIDE
            MEANS OF COP WINDING MACHINES
                   Filed Feb. 3, 1942

Inventor:
Albert Brügger
by Sommer & Young
Attorneys

Patented Oct. 13, 1942

2,298,819

UNITED STATES PATENT OFFICE 2,298,819

AUTOMATIC FEED DEVICE FOR THE THREAD GUIDE MEANS OF COP WINDING MACHINES

Albert Brügger, Horgen, Switzerland

Application February 3, 1942, Serial No. 429,430
In Switzerland November 6, 1940

6 Claims. (Cl. 242—158)

This invention relates to automatic feed devices for the thread guide means of cop winding machines for intermittently displacing said means relative to the associated screw spindle.

According to this invention the arrangement is such that on a sleeve receiving the screw spindle and being rotatably connected with said spindle two coil springs are provided as well as a driving member, so that due to rotational feed movement of the driving member the windings of one of said coil springs are operatively coupled to said sleeve for imparting rotational movement to said sleeve and said spindle for conjoint rotational feed movement of said parts with said member, whereas when the rotational movement of the driving member is reversed, the screw spindle is prevented from sharing in this reversing movement, due to the windings of the other said coil springs then being coupled to said sleeve.

This arrangement results in the thread guide being smoothly fed longitudinally of the screw spindle in consequence whereof the thread is preserved. In connection therewith means are provided for adjusting the angular range of the driving member and thus the amount of feed movement of the thread guide.

In the accompanying drawing an embodiment of the invention is illustrated by way of example only, in which Figs. 1 and 2 show a vertical and a horizontal axial section respectively of the feed device;

Figure 1:
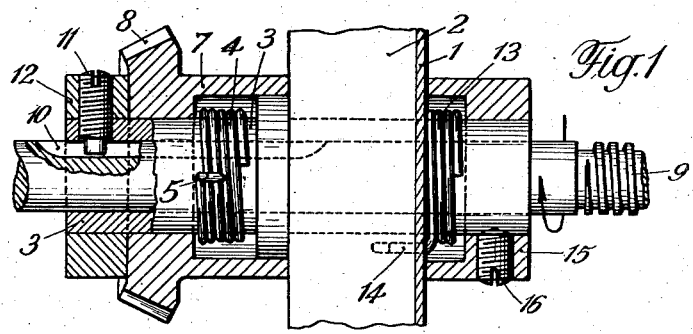

On the gear box 1 of the cop winding machine a guide sleeve 3 is mounted in a bearing 2, on which sleeve is held a coil spring 4 by the windings of the springs fitting the sleeve snugly, in a known manner. The spring 4 which is located on one side of the bearing 2 has a bent up end 5 projecting into a longitudinal slot 6 of a driving socket 7 ending in a rim 8 of bevel gear teeth and providing a feed control member for the sleeve 3. The sleeve 3 is passed through by a screw spindle 9 having a key way 10 into which projects a grub screw 11 connecting an adjusting ring 12 with the guide sleeve 3. By this means the sleeve 3 is coupled to the screw spindle 9 for common rotation, the spindle being, however, displaceable in the axial direction.

On the opposite side of the bearing 2 the sleeve 3 further holds a coil spring 13 by the spring windings fitting snugly with the sleeve, the bent up end 14 of this spring being inserted in a hole in the bearing 2. A protecting cap 15 is secured to the sleeve 3 by means of a grub screw 16. The sleeve 3 guiding the screw spindle 9 is locked to the bearing 2 against axial displacement by the parts 15, 7 and 12.

Figure 3:
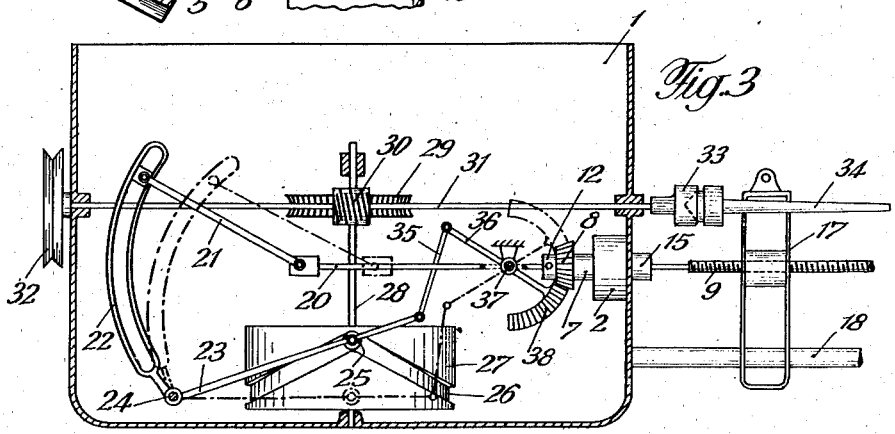
Fig. 3 is a semi-schematical view of the feed device in connection with relevant driving means of a cop winding machine.
Figure 4:
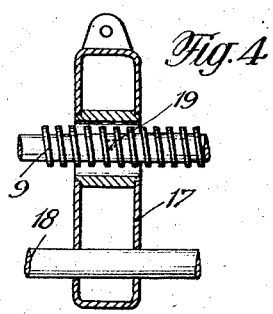
Fig. 4 is a detail view of the thread guide.
Figure 5:
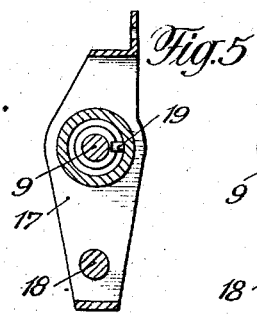
Figs. 5 and 6 show in two views as seen at right angles to that shown in Fig. 4 the thread guide in and out of engagement with the screw spindle.
Figure 6:
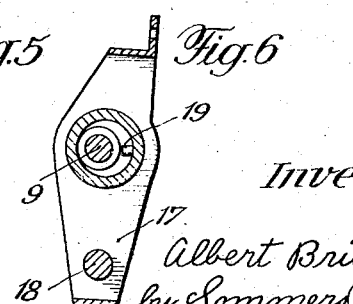

As shown in Fig. 3 a thread guide 17 is associated with the screw spindle 9 and is displaceably arranged on a carrier rod 18. The thread guide 17 is further rockable relative to the carrier rod 18 so that in a proper position of adjustment of the thread guide 17 a coupling pin 19 on the latter can be moved in or out of engagement with the screw thread of the spindle 9, which coupling operation can be carried into effect by means of automatic control means, as required, in any suitable manner.

In effecting the winding operation the thread guide 17 is coupled with the screw spindle 9, and is uncoupled, when the thread guide 17 must be retracted into initial position on the completion of the thread package. An eyelet (not shown) for the passage of the thread is provided upwardly of the thread guide 17. During the winding operation the screw thread 9 is axially reciprocated for effecting the traversing movement of the thread feed. For this purpose the spindle is connected with a bell crank lever 22, 23 through the intermediary of an extension 20 and a link 21. This lever is mounted on a fixed bolt 24 for cooperation with a cam groove in a traversing disc 27 by means of a guide roller 25, the shaft 28 of the disc being driven by means of a worm gearing 29, 30 from the winding spindle 31 which carries a driving pulley 32 at one of its ends and a mounting head 33 for the reception of a winding carrier 34 at the other end.

In order to permit the axial traversing movement imparted to the screw spindle 9 from the traversing disc 27, by means of the parts 23, 22, 21, 20, to be readjusted for varying the length of traverse of the thread feed, the arm 22 of the bell crank lever 22, 23 is in the form of an arcuate slot guide within which the link 21 is adjustably secured.

The arm 23 of the bell crank lever 22, 23 is connected with a two armed lever 36 mounted on a fixed bolt 37 and provided with a toothed segment 38 which is in mesh with the toothed rim 8 on the socket 7.

During the operation of the machine the toothed segment 38 is rocked back and forth from the traversing disc 27 by means of the leverage 23, 35, 36, the other extreme position of the toothed segment 38 and the corresponding position of the said leverage inclusive of the arcuate arm 22 and the link 21 being shown in dot and dash lines in Fig. 3. During each revolution of the traversing disc 27 the toothed segment 38 performs one complete reciprocation about the bolt 37, whereby the driving socket 7 is correspondingly rotatively displaced by the toothed rim 8.

Figure 2:
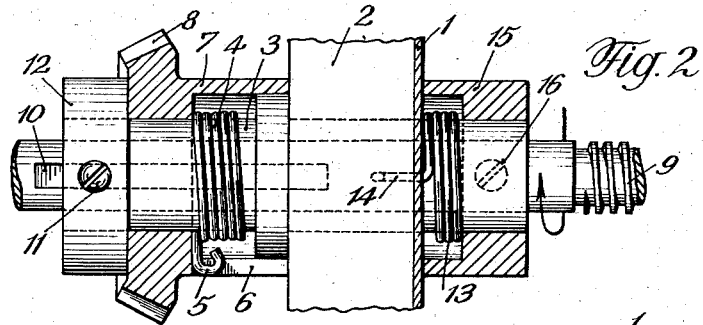

If the driving socket 7 rotates in the direction indicated by the arrows in Figs. 1 and 2 the windings of the coiled spring 4 are subjected to tension which is transmitted to the guide sleeve 3, due to the operative coupling engagement thus obtained between the spring and the sleeve, whereby the latter is accordingly rotated so as to act in the manner of a driving member on the screw spindle 9 through the parts 12, 11, thereby feeding the thread guide 17 by one step.

In turning the driving sleeve 7 backwards the coupling effect of the spring 4 is automatically ceased, whereas during this backward turning the windings of the coil spring 13 are operatively coupled to the guide sleeve 3, thereby arresting said sleeve, so that the screw spindle 9 is firmly kept from rotation. Due to the screw spindle 9 being thus periodically rotatively displaced, the thread guide 17 is accordingly mechanically advanced step by step along said spindle.

On the completion of the cop building operation the thread guide 17 is uncoupled from the screw spindle 9 by automatic means and reset into initial position in a continuous movement, in a known manner. The completed cop is then replaced by a fresh empty winding carrier being inserted in the winding spindle 31.

As will be seen without any further comment the periodical mechanical feeding of the thread guide 17 along the screw spindle 9, by which it is guided, is thus lastingly ensured to operate reliably in a relatively simple manner.

In the instance described the length of traverse of the axially reciprocating guide spindle 9 and thus the range of traverse of the thread feed can be varied depending upon the requirements of practice. Naturally, means may also be provided for varying the length of feed step performed by the thread guide relative to the screw spindle and thus the intermittent shifting of the cop building operation towards the front by making provision, for example, for the link 35 to be adjustable longitudinally of the lever 36.

What I claim is:

1. In an automatic fed device for the thread guide means of cop winding machines a screw spindle for intermittently feeding said thread guide means longitudinally thereof, a sleeve receiving said spindle and connected to same for rotation therewith, two coil springs mounted on said sleeve each adapted to be operatively coupled through its coil to a point extraneous to said sleeve for accordingly controlling said sleeve, a rotatable feed control member arranged on said sleeve, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

2. In an automatic feed device for the thread guide means of cop winding machines a screw spindle carrying said thread guide means and adapted to intermittently feed said guide means longitudinally of said spindle, a sleeve receiving said spindle and connected to same for rotation therewith but allowing for said spindle to shift axially of said sleeve, two coil springs mounted on said sleeve each adapted to be operatively coupled through its coil to a point extraneous to said sleeve for accordingly controlling said sleeve, a rotatable feed control member arranged on said sleeve, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

3. In an automatic feed device for the thread guide means of cop winding machines a screw spindle for intermittently feeding said thread guide means longitudinally thereof, a sleeve receiving said spindle and connected to same for rotation therewith, two coil springs mounted on said sleeve each adapted to be operatively coupled through its coil to a point extraneous to said sleeve for accordingly controlling said sleeve, a feed control member arranged on said sleeve for rotating relative to said sleeve in opposite directions by means of a gear drive, a traversing disc intermittently driving said gear drive in said opposite directions through a leverage, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

4. In an automatic feed device for the thread guide means of cop winding machines a screw spindle for intermittently feeding said thread guide means longitudinally thereof, a sleeve receiving said spindle and connected to same for rotation therewith, but allowing of said spindle to shift axially of said sleeve, two coil springs mounted on said sleeve each adapted to be operatively coupled through its coil to a point extraneous to said sleeve for accordingly controlling said sleeve, a feed control member arranged on said sleeve for rotating relative to said sleeve in opposite directions, by means of a gear drive, a traversing disc intermittently driving said gear drive in said opposite directions through a leverage, lever means actuated by said traversing disc for axially reciprocating said spindle relative to said sleeve, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

5. In an automatic feed device for the thread guide means of cop winding machines a screw spindle for intermittently feeding said thread guide means longitudinally thereof, a sleeve receiving said spindle and connected to same for rotation therewith, but allowing of said spindle to shift axially of said sleeve, two coil springs mounted on said sleeve each adapted to be operatively coupled through its coil to a point extraneous to said sleeve for accordingly controlling said sleeve, a feed control member arranged on said sleeve for rotating relative to said sleeve in opposite directions, by means of a gear drive, a traversing disc intermittently driving said gear drive in said opposite directions through a leverage, said leverage being also instrumental in axially reciprocating said spindle feeding said thread guide axially relative to said sleeve, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

6. In an automatic feed device for the thread guide means of cop winding machines a screw spindle for intermittently feeding said thread guide means longitudinally thereof, a sleeve receiving said spindle and connected to same for rotation therewith, but allowing of said spindle to shift axially of said sleeve, two coil springs mounted on said sleeve each adapted to be operatively coupled through its coil to a point extraneous to said sleeve for accordingly controlling said sleeve, a feed control member arranged on said sleeve for rotating relative to said sleeve in opposite directions, by means of a gear drive, a traversing disc intermittently driving said gear drive in said opposite directions through a leverage of variable multiplying ratio, said leverage being also instrumental in axially reciprocating said spindle feeding said thread guide axially relative to said sleeve, means for coupling the coil of one of said springs to said control member for said member to impart its rotational feed movement to said sleeve and through the latter to said spindle, and means for coupling the coil of the other said springs to a point being stationary relative to said sleeve for preventing said sleeve from sharing in the backward rotation of said control member while said spindle resets into initial position.

ALBERT BRÜGGER.